United States Patent
Ruiz et al.

(10) Patent No.: US 12,496,460 B2
(45) Date of Patent: Dec. 16, 2025

(54) SYSTEM AND METHOD FOR QUANTITATIVE DOSIMETRY OF PHOTODYNAMIC THERAPY IN SKIN

(71) Applicant: Trustees of Dartmouth College, Hanover, NH (US)

(72) Inventors: Alberto J. Ruiz, Hanover, NH (US); Ethan P. M. Larochelle, Thetford Center, VT (US); Brian Pogue, Hanover, NH (US)

(73) Assignee: Trustees of Dartmouth College, Hanover, NH (US)

( * ) Notice: Subject to any disclaimer, the term of this patent is extended or adjusted under 35 U.S.C. 154(b) by 1162 days.

(21) Appl. No.: 17/154,430

(22) Filed: Jan. 21, 2021

(65) Prior Publication Data

US 2021/0220665 A1    Jul. 22, 2021

Related U.S. Application Data

(60) Provisional application No. 62/963,830, filed on Jan. 21, 2020.

(51) Int. Cl.
*A61N 5/06*        (2006.01)
*A61B 5/00*        (2006.01)
*A61N 5/067*       (2006.01)

(52) U.S. Cl.
CPC ............ *A61N 5/062* (2013.01); *A61B 5/0059* (2013.01); *A61N 2005/063* (2013.01); *A61N 5/067* (2021.08)

(58) Field of Classification Search
CPC ... A61B 5/0075; A61B 5/0071; A61B 5/6898; A61B 5/0093; A61B 5/1455; A61B 5/02416; A61B 5/0261; A61B 5/0059–0079; A61N 5/062; A61N 5/067; A61N 2005/063; A61N 2005/0628; A61N 2005/0643; G01T 1/10
See application file for complete search history.

(56) References Cited

U.S. PATENT DOCUMENTS

| | | | |
|---|---|---|---|
| 9,185,200 B2 * | 11/2015 | Cunningham | G01N 21/31 |
| 9,360,366 B1 * | 6/2016 | Tran | G01J 3/0264 |
| 10,830,641 B2 * | 11/2020 | Mai | G01J 3/45 |
| 11,067,446 B2 * | 7/2021 | Roentgen | G01J 3/0208 |
| 11,154,198 B2 * | 10/2021 | Dacosta | A61B 5/72 |

(Continued)

OTHER PUBLICATIONS

Jessica Tyrrell, et al., "Validation of a non-invasive fluorescence imaging system to monitor dermatological PDT", Photodiagnosis and Photodynamic Therapy, vol. 7, No. 2, 2010, pp. 86-97.

*Primary Examiner* — Shirley X Jian
(74) *Attorney, Agent, or Firm* — Oblon, McClelland, Maier & Neustadt, L.L.P.

(57) ABSTRACT

While clinical treatment of actinic keratosis by photodynamic therapy (PDT) is widely practiced, there is well-known variability in response, primarily caused by heterogeneous accumulation and PDT-induced photobleaching of the photosensitizer protoporphyrin IX (PpIX) between patients and between lesions. One of the key factors in regularizing this treatment would be to have an easily accessible indicator of PpIX present in the lesions at the time of light delivery. Described herein, a smartphone-based fluorescence imager was developed to allow simple quantitative photography of the lesions and their PpIX levels.

17 Claims, 9 Drawing Sheets

(56) References Cited

U.S. PATENT DOCUMENTS

| | | | |
|---|---|---|---|
| 11,199,498 B2* | 12/2021 | Blair | G01J 3/4406 |
| 11,213,208 B2* | 1/2022 | Hwang | A61B 5/441 |
| 11,284,800 B2* | 3/2022 | Dacosta | A61B 5/0059 |
| 11,375,898 B2* | 7/2022 | Dacosta | G01N 21/6486 |
| 11,676,276 B2* | 6/2023 | Dacosta | A61B 5/445 |
| | | | 382/128 |
| 11,954,861 B2* | 4/2024 | DaCosta | A61B 5/0077 |
| 11,961,236 B2* | 4/2024 | Dacosta | A61B 5/445 |
| 12,169,935 B2* | 12/2024 | Dacosta | A61B 5/0077 |
| 12,226,186 B2* | 2/2025 | Dacosta | A61B 5/0059 |
| 12,251,191 B2* | 3/2025 | Dacosta | G01N 21/6456 |
| 2001/0035853 A1* | 11/2001 | Hoelen | G02F 1/133603 |
| | | | 345/102 |
| 2006/0091406 A1* | 5/2006 | Kaneko | G02F 1/133603 |
| | | | 257/E25.02 |
| 2011/0130652 A1* | 6/2011 | Boppart | A61B 3/102 |
| | | | 600/425 |
| 2014/0312247 A1* | 10/2014 | McKee | G01N 21/6456 |
| | | | 250/459.1 |
| 2014/0354868 A1* | 12/2014 | Desmarais | G01J 3/0289 |
| | | | 348/333.01 |
| 2015/0185081 A1* | 7/2015 | Sano | G01J 3/0235 |
| | | | 356/456 |
| 2016/0045114 A1* | 2/2016 | Dacosta | A61B 5/742 |
| | | | 600/476 |
| 2017/0236281 A1* | 8/2017 | Dacosta | G06T 7/0016 |
| | | | 382/128 |
| 2017/0303790 A1* | 10/2017 | Bala | G06T 7/11 |
| 2018/0143073 A1* | 5/2018 | Goldring | G01J 3/42 |
| 2020/0104998 A1* | 4/2020 | Dacosta | G06T 7/0016 |
| 2020/0121190 A1* | 4/2020 | Whitehead | G16H 30/40 |
| 2020/0352515 A1* | 11/2020 | Godavarty | A61B 5/14552 |
| 2021/0260580 A1* | 8/2021 | Bennett | B03C 5/005 |
| 2021/0400211 A1* | 12/2021 | Galitz | A61B 5/0075 |
| 2023/0412905 A1* | 12/2023 | Wei | G02B 21/16 |

* cited by examiner

SYSTEM AND METHOD FOR QUANTITATIVE DOSIMETRY OF PHOTODYNAMIC THERAPY IN SKIN

CROSS REFERENCE TO RELATED APPLICATIONS

This present disclosure claims the benefit of U.S. Provisional Application No. 62/963,830, filed on Jan. 21, 2020, which is incorporated herein by reference in its entirety.

STATEMENT REGARDING FEDERALLY SPONSORED RESEARCH OR DEVELOPMENT

This invention was made with government support under grant number P01 CA084203 awarded by the National Institutes of Health. The government has certain rights in the invention.

FIELD

The present disclosure relates to a fluorescence imaging apparatus for quantitative photography of lesions and PpIX levels therein.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Clinical use of protoporphyrin IX (PpIX) based photodynamic therapy (PDT) is widespread for treatment of actinic keratosis (AKs) and increasingly adopted for treatment of non-melanoma skin cancers (NMSCs) due to its effectiveness, safety, and cosmetic results. PpIX-based skin PDT involves the topical application of the prodrug aminolevulinic acid (ALA) or methyl aminolevulinate (MAL) to selectively generate the photosensitizer PpIX in the lesion; after incubation, the lesion is commonly irradiated with light where localized cytotoxicity is induced via reactive molecular species. While there is widespread use of skin PDT, the complete clearance rate of AKs can vary from ~59-91%, where the origins of this variability in response is thought to come from the heterogeneity of drug absorption and PpIX accumulation between patients and between lesions.

Dosimetry of PpIX at the point-of-care can help guide critical decisions in PDT, given that initial accumulation and PDT-induced photobleaching serve as strong indicators for patient outcomes in treatment. Nonetheless, in the clinical setting, dosimetry is rarely performed during PDT treatments to personalize incubation times and light doses, primarily due to lack of practical dosimetry devices and limited predictive methods for corrective action if the PpIX levels look low. The sparse use of dosimetry in clinical PDT studies has led to a restricted understanding of optimal treatment parameters that are further confounded by the adoption of newer treatment protocols, such as daylight-PDT with minimization of the ALA incubation time. Nonetheless, if it was known that there were sub-optimal levels of PpIX, there are a range of actions that could be taken to mitigate this, including increased incubation times, increased skin temperature, reapplication of ALA after curettage, differentiation therapy, and fractionated light treatment.

Notably, wide-field imaging of PpIX shows promise in guiding photodynamic therapy by providing easily accessible drug production information at the point-of-care for these treatment enhancements, which may reduce repeat PDT visits or the added cost of future surgical treatments. Thus, a quantitative wide-field fluorescence imaging system for PpIX-PDT dosimetry designed for clinical treatment of the skin is desired.

SUMMARY

The present disclosure relates to a fluorescence imaging apparatus, including: a housing including a first end, a second end, and an exit aperture disposed at the first end and optically connected to a window disposed at the second end, a mount disposed at the second end and configured to removeably couple a computing device to the housing such that an optical sensor of the computing device is aligned with the window, and an optical filter disposed between the optical sensor and the exit aperture; a light array disposed at the first end of the housing, the light array including a plurality of excitation light sources and a plurality of imaging light sources, the plurality of excitation light sources configured to emit light in a predetermined excitation wavelength range, the plurality of imaging light sources configured to emit light in a predetermined imaging wavelength range; and a cushion removeably attached to the first end of the housing and surrounding the exit aperture, the cushion configured to couple the first end of the housing to a surface of an object to prevent light from an exterior of the cushion from entering an interior of the cushion, wherein the optical filter is configured to prevent transmission of electromagnetic radiation having a wavelength in the predetermined excitation wavelength range.

The disclosure additionally relates to a fluorescence imaging system, including: fluorescence imaging apparatus; and the computing device, which includes a memory, processing circuitry, and the optical sensor, wherein the processing circuitry is configured to set a shutter speed, an ISO, and a focal distance, of the optical sensor, receive, via the optical sensor, an image; and store the image The disclosure additionally relates to a fluorescent imaging using an imaging apparatus including a computing device, a housing, a light array, and a power source, the computing device including an optical sensor, a memory, and processing circuitry, the housing including a first end, a second end, an exit aperture disposed at the first end and optically connected to a window disposed at the second end, a mount disposed at the second end and configured to removeably couple the computing device to the housing such that the optical sensor is aligned with the window, and an optical filter disposed between the optical sensor and the exit aperture, the light array disposed at the first end of the housing, the light array including a plurality of excitation light sources and a plurality of imaging light sources, the plurality of excitation light sources configured to emit light in a predetermined excitation wavelength range, the plurality of imaging light sources configured to emit light in a predetermined imaging wavelength range, and a cushion removeably attached to the first end of the housing and surrounding the exit aperture, the cushion configured to couple the first end of the housing to a surface of an object to prevent light from an exterior of the cushion from entering an interior of the cushion, the method including: arranging the imaging apparatus so as to press against the object such that the light from the exterior is prevented from entering the interior of the cushion; receiving, via the optical sensor, an image; storing the image in the memory; and determining, via the processing circuitry, an intensity value for each of a plurality of pixels in the image.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1A:
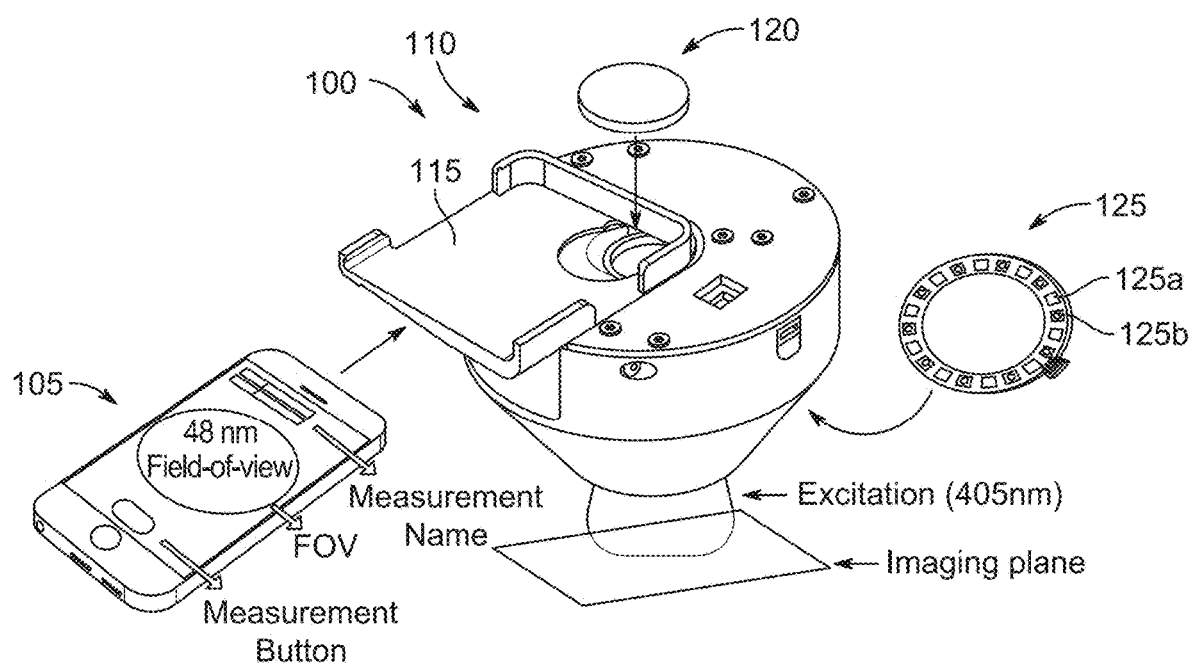
FIG. 1A is a schematic of a fluorescence imaging system, according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Point-probe and wide-field protoporphyrin IX (PpIX) fluorescence have been used in a limited number of clinical studies for visual localization of lesions and to correlate photosensitizer accumulation and photo-bleaching to treatment outcomes. Devices that have achieved translational clinical use, for example FluoDerm (Dia Medico ApS, Denmark), are used primarily for qualitative visualization and are unable to provide quantitative wide-field dosimetry of a lesion, which is necessary to account for the millimeter-level variations in photosensitizer accumulation. Devices capable of quantitative dosimetry have not achieved translational use mainly due to problems with measurement reproducibility, system cost, and ease-of-use. Point-probe measurements suffer from reproducibility issues due to variability of PpIX accumulation along the surface of the skin and sensitivity to applied probe pressure during measurement. Wide-field devices suffer from measurement inconsistencies related to system warm-up, measurement angle, and varying lighting environments.

Techniques herein describe a quantitative wide-field fluorescence imaging system for PpIX-based photodynamic therapy (PDT) dosimetry designed for clinical treatment of the skin and for maximal ease in translation into clinical workflow. The hand-held system includes a method for image acquisition and analysis based upon an iPhone 6S platform, with physical light management from a 3D printed base that includes a long-pass optical filter for signal isolation, and custom 405 nm wavelength light source and electronics for PpIX excitation. In the following sections, an overview is provided of the dosimeter design followed by system characterization, preclinical, and clinical results.

Figure 1B:
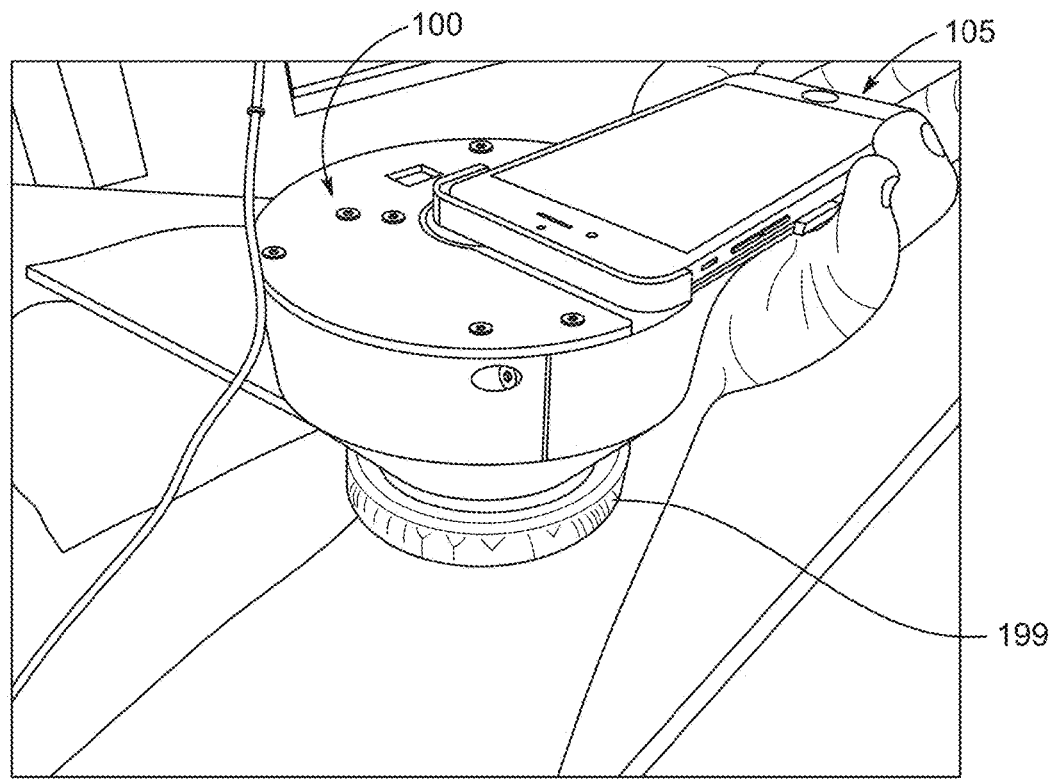
FIG. 1B is an optical image of a fluorescence imaging system, according to an embodiment of the present disclosure.

FIG. 1A shows a schematic of a fluorescence imaging system 100, according to an embodiment of the present disclosure. FIG. 1B shows an optical image of the fluorescence imaging system 100, according to an embodiment of the present disclosure. In an embodiment, the fluorescence imaging system 100 includes a computing device 105, such as an iPhone 6s smartphone, having an application for streamlined image acquisition installed therein, a housing 110 including a first end, a second end, and an exit aperture disposed at the first end and optically connected to a window disposed at the second end, a mount 115 disposed at the second end and configured to removeably couple the computing device 105 to the housing such that an optical sensor of the computing device 105 is aligned with the window, and an optical filter 120 disposed between the optical sensor and the exit aperture, and a light array 125 disposed at the first end of the housing 110, the light array 125 including a plurality of excitation light sources 125a and a plurality of imaging light sources 125b, the plurality of excitation light sources 125a configured to emit light in a predetermined excitation wavelength range (for example to induce PpIX excitation), the plurality of imaging light sources 125b configured to emit light in a predetermined imaging wavelength range. The following briefly summarizes the design and function of each component.

The computing device can include processing circuitry, a memory, and the optical sensor. The processing circuitry can be configured to set a shutter speed, an ISO, and a focal distance, of the optical sensor, receive, via the optical sensor, an image, and store the image in the memory. The processing circuitry can be further configured to determine an intensity value for each of a plurality of pixels in the image. In one example, the focal distance of the optical sensor is fixed and in a range of 5-1,000 mm. The optical sensor of the computing device 105, such as the 12MP back-facing camera of the iPhone 6s, is used for imaging given its ability to manually control camera parameters and provide the RAW pixel intensity values in 12-bit format. A native iOS application was developed for providing fixed imaging parameters, generating RAW output images, and developing a streamlined clinical workflow. Current implementation of the application fixes the imaging parameters via software and allows, through the visual interface, for a user to name an acquired image and initiate a measurement through a single button press; the result of this measurement is both RAW and JPEG images taken at the fixed, software determined, imaging parameters.

The housing 110 can be a 3D printed base for measurement standardization and system integration. While a 3D printed base is discussed, other forms of fabrication and fabrication materials can be contemplated, such as injection molding or thermoforming of polymers, CNC routing of metals, polymers, wood, or other, etc. The base is used for system integration and measurement standardization by physically blocking external light with a black plastic printing material. In an embodiment, a cushioned ring 199 can be attached to the exit aperture which allows coupling to a user's skin or other target surface. Notably, the base and the cushion can be black or any other opaque color to block external light. The base of the housing 110 fixes the detector-to-imaging plane distance for consistent quantitative images. The base includes three components: a measurement cone, an electronics bay, and a top cover; these components are fastened together using screws, but any other fastener can be contemplated, such as clips, ties, adhesives, snaps, etc. Notably, the design of the base alongside the cushioned ring form an isolated lighting environment that allows the system 100 to overcome measurement repeatability issues faced by previously reported systems, including variation in measurement angles and lighting environments.

The detector-to-imaging plane distance was set at 72 mm, which is approximately the minimum focusing distance achievable by the native optics of the iPhone 6s back-facing camera. The output aperture of the measurement base provided a circular field-of-view of 48 mm. Other distances for both the detector-to-imaging plane and the circular field-of-view can be used based on the computing device 105 and the optical sensor in the computer device 105, as well as the field-of-view based on the design of the base and additional lenses to shorten the minimal focal distance of the imaging device.

The optical filter 120 was chosen to block the 405 nm excitation light and to isolate the PpIX fluorescent signal (e.g. 600-700 nm). For optical filter 120 material selections, dielectric, color-glass, and gel filters were tested. The decision criteria of the optical filter 120 was based upon maximizing emission throughput while minimizing filter autofluorescence; both dielectric and gel optical filters 120 were assessed for the final system 100 design. One example design uses a 600 nm long-pass dielectric filter (e.g. 600LP RapidEdge, Omega Optical Inc., Brattleboro, VT), which, based upon in-vivo testing, led to a maximal PpIX signal-to-skin autofluorescence signal ratio. Other filters, including band-pass optical filters, can be used to optimize for different spectral emission properties.

The system 100 can use, for example, a custom LED ring for the light array 125 to provide a phone-independent uniform light source for UV excitation and white-light illumination as the plurality of excitation light sources 125a and the plurality of imaging light sources 125b. The ring includes, for example, 405 nm LEDs (e.g. Vishay VLMU3100) and 3000K white LEDs (e.g. Cree J-Series JE2834AWT) providing light intensities of, for example, 4.5 mW/cm$^2$ and 2.6 mW/cm$^2$ at the measurement output, respectively. The LEDs can be mounted on a 1.6 mm aluminum metal-core PCB (e.g. 2 oz Cu trace) to provide passive thermal management. That is, the light array 125 is mounted on a heat sink or a PCB serving as a heat sink attached to the first end of the housing. In an embodiment, the light array 125 is arranged between the optical sensor and the exit aperture. Notably, the plurality of excitation light sources 125 can be configured to emit the light in the predetermined excitation wavelength range, which is 280 nm to 850 nm.

The system power electronics includes a 3.7V lithium-polymer battery (e.g. #259, Adafruit Inc., NYC, NY), USB battery manager (#2011, Adafruit Inc., NYC, NY), and constant current driver (MIC2287, Microchip Technology Inc., Chandler, AZ) to provide power to the LED ring (40 mA, constant current) and enable stable light output and rechargeability in a modular package. Current electronics implementation utilizes a physical switch mounted on the side of the base for manual operation of the light array 125. Other methods of operation include automated light operation via wireless communication with a microcontroller circuit, such as an Arduino.

To ensure measurement reproducibility, the system's 100 spectral, electrical, and pixel linearity characteristics were evaluated. To measure the spectral output of the 405 nm and white LEDs an Apogee SS-110 VIS spectrometer was used. To measure optical filter transmission spectra, a Cary 50 Bio UV-VIS spectrophotometer was used.

Pixel linearity of the iPhone's camera was tested by varying the driving current of the white LED array to generate increasing irradiances, which were measured by a photometer (S120VC, Thorlabs Inc., Newton, NJ). These irradiances were then imaged by the computing device 105 on a highly reflective silicone TiO$_2$ phantom ($\mu_a$=0.0078, $\mu'_s$=1.967 at 526 nm). The RAW and JPEG generated images were analyzed using MATLAB to generate average pixel values vs. irradiance curves.

To ensure electrical and emission output stability of the design, which is advantageous for reproducible illumination environments, an optical power meter (S120C, Thorlabs, Newton NJ) was used to observe potential on/off current spikes as well as to test the long-term output stability of the system 100.

The fluorescence sensitivity of the system 100 was studied using 1% intralipid phantoms with varying PpIX concentrations (0.01-2 µM) alongside a control sample with no PpIX. Intralipid was used as a scattering agent in the mixture. The liquid phantoms were manufactured by combining PpIX powder (P8293-1G, Sigma-Aldrich Inc.) with dimethyl sulfoxide (DMSO) and serially diluting with a 1% intralipid solution manufactured from 20% intralipid stock and 1× phosphate-buffered saline (PBS). The serial dilutions were deposited into 5 mL DELRIN wells and imaged with the system 100. The PpIX concentrations imaged were 2 µM, 1 µM, 0.75 µM, 0.5 µM, 0.25 µM, 0.1 µM, 0.05 µM, 0.01 µM, and 0 µM. The imaging parameters used for these measurements were RAW images with ISO 400 and exposure set to $\frac{1}{10}^{th}$ sec. Images were pre-processed using Adobe DNG Converter software and analyzed using MATLAB and ImageJ to extract the RAW pixel values.

EXAMPLES

Example 1—Preclinical In-vivo Murine Measurements: The nude mouse model was used to examine the system's 100 ability to capture in-vivo production of PpIX. The measurements were performed on five athymic nude mice fed a low-chlorophyll diet to minimize tissue autofluorescence. For imaging, the mice were placed under anesthesia and onto a heated pad to regulate their body temperature; the temperature was monitored using an IR camera (TG165, FLIR Systems Inc.) and kept in the 32° C.-36° C. range. AMELUZ® (Biofontera Inc., Boston, MA), a 10% aminolevulinic acid hydrochloride gel, was topically applied to the backs of the mice as to contain an ALA-applied area and a control area within the field-of-view of the system 100. The mice were kept in a low-light environment to prevent photobleaching of the accumulated PpIX. Images of the mice were taken at 10-minute intervals for the first hour with subsequent images at two and three hours of incubation. The mice were kept under anesthesia during the first hour, placed back in the cage, and briefly placed back under anesthesia for imaging at two and three hours of incubation. The imaging parameters used for these measurements were iOS-generated images with ISO 400 and exposure set to $\frac{1}{10}^{th}$ sec. The images were processed in ImageJ, where the red pixels were isolated for region-of-interest (ROI) pixel intensity calculation.

Figure 2A:
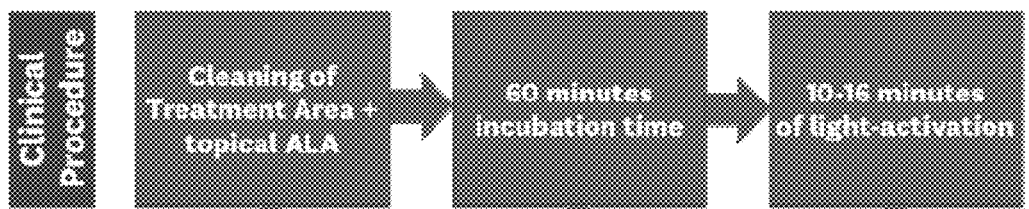
FIG. 2A is a workflow schematic for the clinical procedure used for Levulan in AK-PDT treatment at Dartmouth-Hitchcock Dermatology, according to an embodiment of the present disclosure.
Figure 2B:
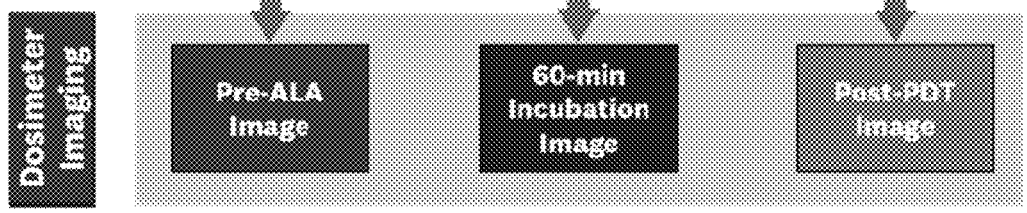
FIG. 2B is a workflow schematic for the system to acquire images, according to an embodiment of the present disclosure.
Figure 2C:
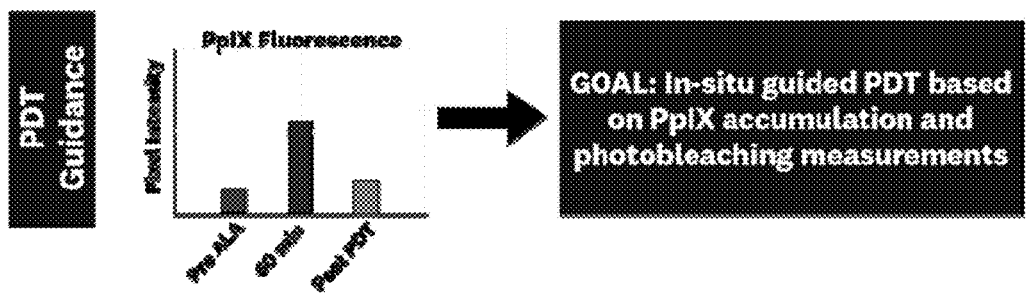
FIG. 2C is a workflow schematic for proposed PDT guidance from PpIX accumulation and PDT-induced photobleaching measurements, according to an embodiment of the present disclosure.

Example 2—Human Skin Test Measurement: In this human testing, the system's 100 performance was evaluated on three patients undergoing their standard clinical PDT treatment at the Dartmouth-Hitchcock Dermatology Department for treatment of AKs using Levulan® (Sun Pharma Industries Ltd., Mumbai, India), a 20% ALA solution [see FIG. 2A]. FIG. 2A shows a workflow schematic for the clinical procedure used for Levulan in AK-PDT treatment at Dartmouth-Hitchcock Dermatology, according to an embodiment of the present disclosure. FIG. 2B shows a workflow schematic for the system 100 to acquire images, according to an embodiment of the present disclosure. FIG. 2C shows a workflow schematic for proposed PDT guidance from PpIX accumulation and PDT-induced photobleaching measurements, according to an embodiment of the present disclosure. The standard procedure involves treatment of a site (e.g. face, scalp, arms, or legs) which is cleaned using ethanol and followed by non-occluded topical application of the ALA; the patient is then transferred to a low-light rest area for a 60-minute incubation period. After the 1-hour incubation, the patient is given 10-16 minutes of blue-light (Sun Pharma Industries Ltd., Mumbai, India) PDT based on the dermatologist's prescription. Fluorescence images from a treatment site are gathered before the ALA is applied, at the 60-minute incubation, and post-PDT treatment [see FIG. 2B]. Discomfort levels experienced by the imaged patients were recorded during light irradiation via verbal rating of the pain. The goal of performing dosimeter imaging using the system 100 during treatment is to correlate the measured PpIX accumulation and PDT-induced photobleaching to patient outcomes and generate thresholds that can be used for individualized treatment guidance [see FIG. 2C]. The dosimetry procedure can be inserted into a regular clinical workflow adding less than a minute to the total treatment time. The imaging parameters used for these measurements were RAW images with ISO 400 and exposure set to $\frac{1}{10}^{th}$ sec. Images were pre-processed using Adobe DNG Converter software and analyzed using MATLAB and ImageJ to extract the RAW pixel values.

Figure 3A:
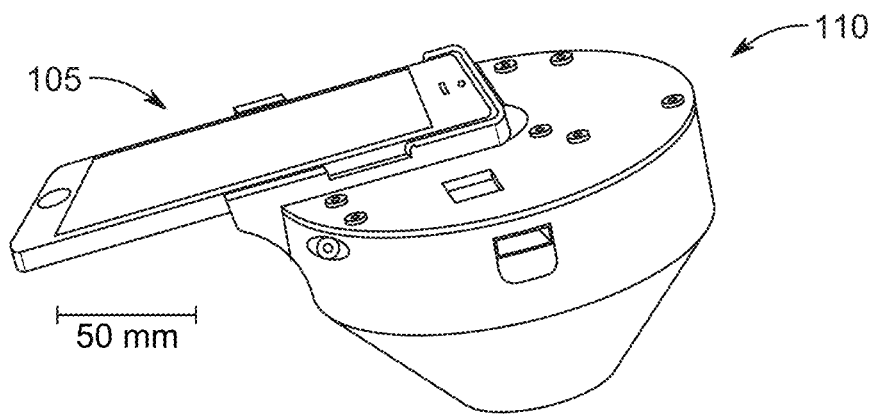
FIG. 3A is a schematic of the system assembled, according to an embodiment of the present disclosure.

FIG. 3A shows a schematic of the system 100 assembled, according to an embodiment of the present disclosure. The assembled system 100 was tested for pixel linearity and emission output stability.

Figures 3B, 3C:
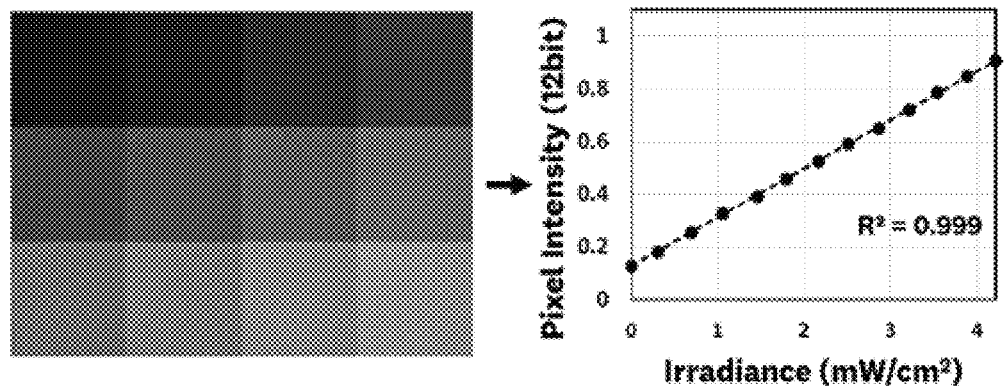
FIG. 3B shows pixel linearity tests for varying irradiances at the imaging-plane, according to an embodiment of the present disclosure.
FIG. 3C shows a plot of the pixel intensity versus irradiance values, according to an embodiment of the present disclosure.

FIG. 3B shows pixel linearity tests for varying irradiances at the imaging-plane, according to an embodiment of the present disclosure. FIG. 3C shows a plot of the pixel intensity versus irradiance values, according to an embodiment of the present disclosure. The pixel linearity results showed the optical sensor's ability to recover a linear relationship between pixel intensity and irradiance at the imaging plane when using the RAW image format; the "phone-processed" RGB images (i.e. RGB images processed by the computing device 105) were not linear with external irradiance values. Another advantage of using the RAW image format on the iPhone is its 12-bit dynamic range output, compared to the standard 8-bit range for phone-processed images.

Figure 3D:
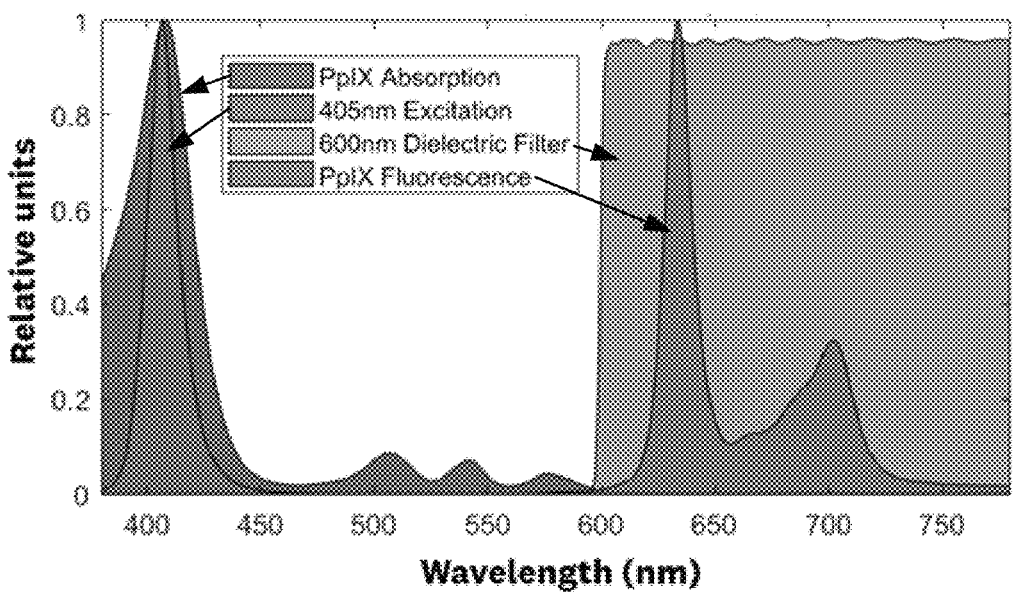
FIG. 3D shows spectral plots of PpIX absorption and emission alongside the system's 100 excitation output and long-pass filter transmission, according to an embodiment of the present disclosure.

FIG. 3D shows spectral plots of PpIX absorption and emission alongside the system's 100 excitation output and long-pass filter 120 transmission, according to an embodiment of the present disclosure. Spectral measurements of the system 100 showed great overlap of the 405 nm emission with the PpIX absorption spectra, blocking of the excitation emission by the spectral filter 120 (OD 4-5), and transmission of 95%+ for the PpIX fluorescence signal. It is worth noting that pixel intensity measurements with varying long-pass filters 120 showed significant transmission of blue-green wavelengths into the red-specific pixels; this meant that, to truly isolate the PpIX signal and prevent excitation wavelengths from "bleeding" into the red-channel signal, the system 100 required a long-pass filter 120 specific for the red wavelengths.

Electrical and emission stability measurements showed output power stability within 1% for the 405 nm source driven at 40 mA for a two-minute period. Furthermore, on/off cycling of the light array 125 showed flat top-hat profiles with no significant spikes in emission or electrical output.

The irradiance imaging, spectral, electrical, and excitation emission measurements showed the ability of the system 100 to reliably reproduce measurement conditions. The system's 100 light output stability, imaging linearity, consistent illumination environment, and fixed detector-to-imaging plane distance allows the smartphone-based dosimeter system 100 to overcome the reproducibility challenges faced by previously reported wide-field fluorescence systems.

Figure 4A:
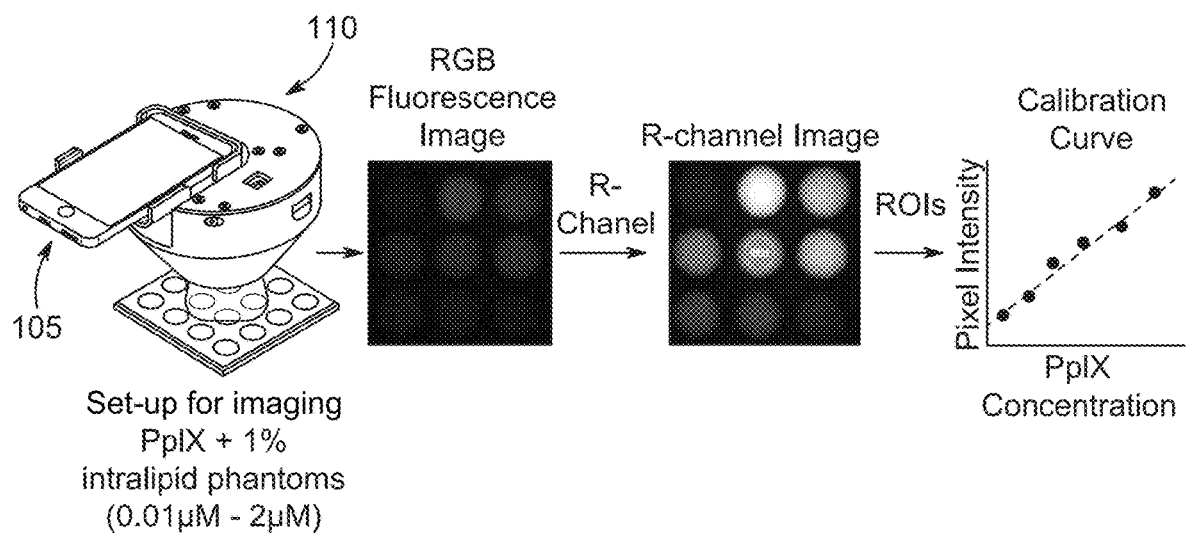
FIG. 4A shows a schematic of the workflow for generating a calibration curve when imaging PpIX+1% intralipid phantoms with the dosimeter system for varying PpIX concentrations in the 0.01-2 µM range, according to an embodiment of the present disclosure.

FIG. 4A shows a schematic of the workflow for generating a calibration curve when imaging PpIX+1% intralipid phantoms with the dosimeter system 100 for varying PpIX concentrations in the 0.01-2 µM range, according to an embodiment of the present disclosure. Measurement of the system's 100 sensitivity involved imaging of 1% intralipid phantoms with varying PpIX concentrations within the 0.01 µM-2 µM range alongside a control, followed by isolating of the red-pixel RAW values to generate a calibration curve.

Figures 4B, 4C, 4D:
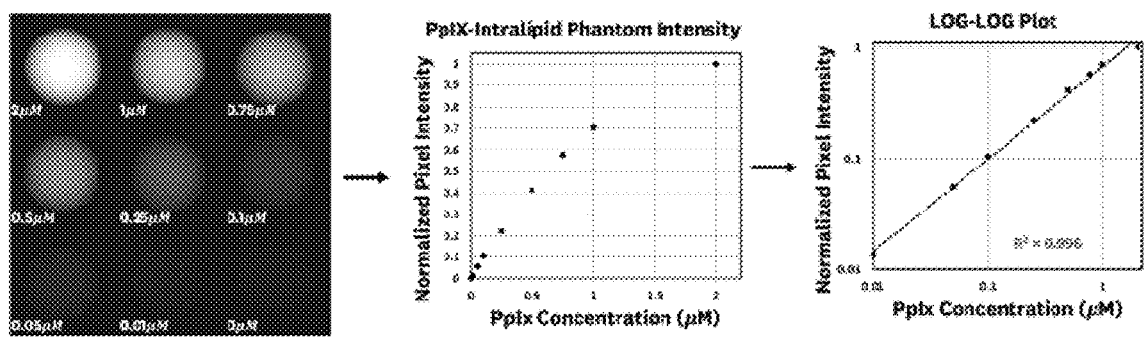
FIG. 4B shows resulting red-pixel intensity images using RAW format, according to an embodiment of the present disclosure.
FIG. 4C is a resulting plot of normalized pixel intensity vs. concentration, according to an embodiment of the present disclosure.
FIG. 4D is a Log-Log plot of data showing high linearity (slope=0.83, $R^2$=0.996, least-squares fit) for the measurement range, according to an embodiment of the present disclosure.

FIG. 4B shows resulting red-pixel intensity images using RAW format, according to an embodiment of the present disclosure. FIG. 4C shows a resulting plot of normalized pixel intensity vs. concentration, according to an embodiment of the present disclosure. FIG. 4D shows a Log-Log plot of data showing high linearity (slope=0.83, $R^2$=0.996, least-squares fit) for the measurement range, according to an embodiment of the present disclosure. The imaging results in FIG. 4B showed the system's 100 ability to detect the full 0.01 µM-2 µM range [see FIG. 4C] where plotting the data in a log-log scale shows linearity with an $R^2$=0.996 for a least-squares fit [see FIG. 4D].

These results show the system's 100 ability to detect clinically relevant PpIX concentrations within the 0.01 µM-2 µM range alongside with high linearity in these measurements (slope=0.83, $R^2$=0.996, least-squares fit). The high linearity obtained should enable the creation of skin-PpIX concentration curve calibrations based on more intricate phantom models and in-vivo measurements. These results show the system's 100 viability to perform quantitative dosimetry and were the basis for proceeding to preclinical and clinical measurements of fluorescence.

Figure 5A:
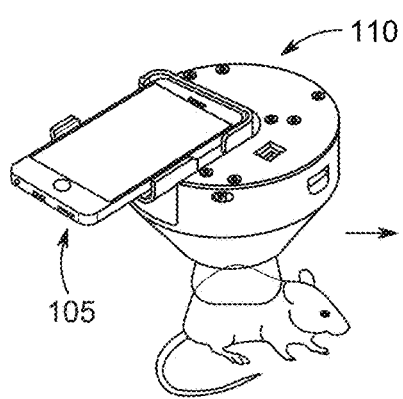
FIG. 5A is a schematic of a testing set-up for in-vivo imaging of PpIX accumulation in athymic nude mice, according to an embodiment of the present disclosure.

FIG. 5A shows a schematic of a testing set-up for in-vivo imaging of PpIX accumulation in athymic nude mice, according to an embodiment of the present disclosure. A total of five mice were imaged for tracking the in-vivo accumulation of PpIX via topical application of ALA, showing monotonic increase of the fluorescence over the three hours of incubation.

Figure 5B:
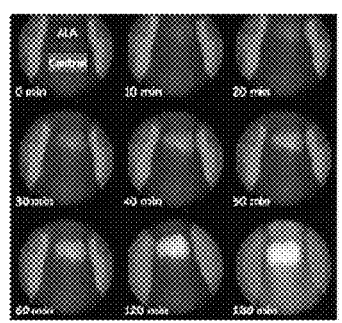
FIG. 5B is resulting images that include topically-applied ALA and control regions of interest (ROI), according to an embodiment of the present disclosure.
Figure 5C:
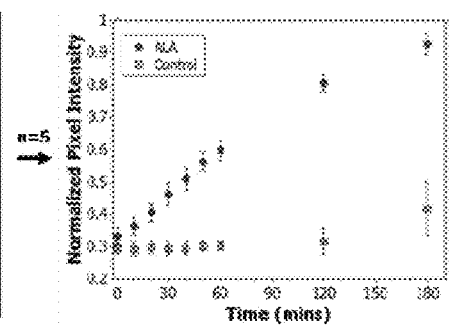
FIG. 5C is a plot of pixel intensity vs. time for the ALA and control ROI (averaged for five mice), according to an embodiment of the present disclosure.

FIG. 5B shows resulting images that include topically-applied ALA and control regions of interest (ROI), according to an embodiment of the present disclosure. FIG. 5C shows a pixel intensity vs. time plot for the ALA and control ROI (averaged for five mice), according to an embodiment of the present disclosure. In this murine model, it was possible to quantitatively observe the PpIX accumulation in the ALA-applied area as early as 10 minutes with a clear visual accumulation in the 20-30 minute timeframe. In contrast, the control region was relatively flat for the first hour with a moderate increase in fluorescence observed at the two hour and three hour measurements as the mice begin systematic accumulation of the PpIX.

Figure 6A:
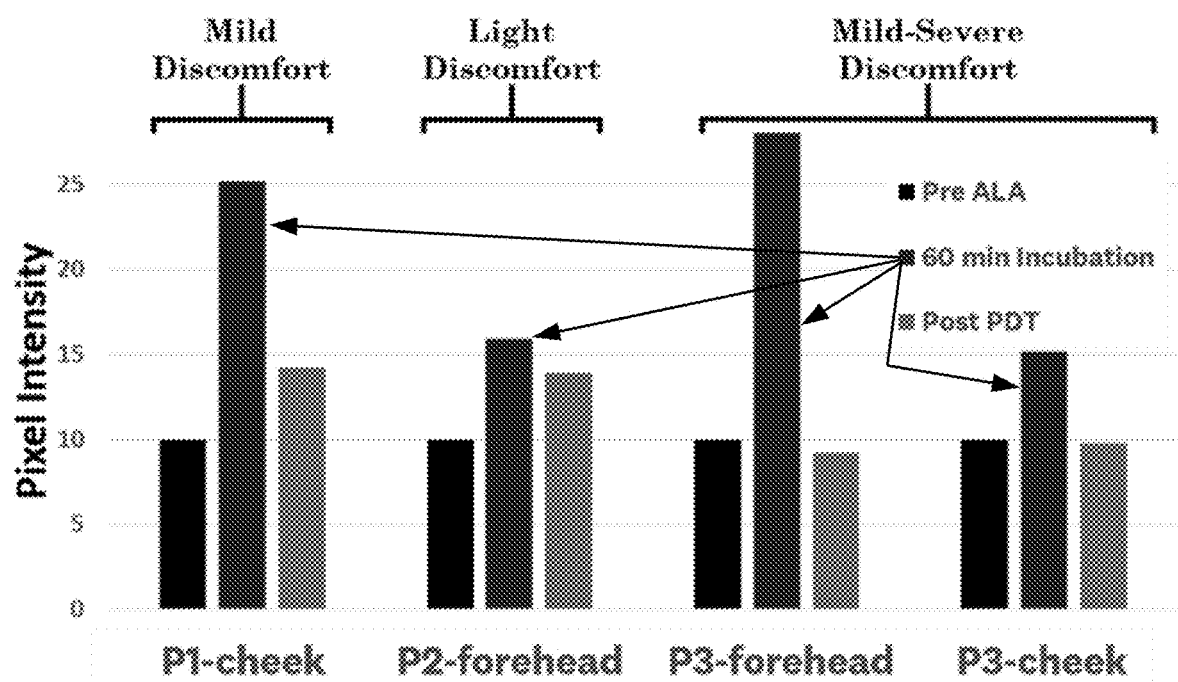
FIG. 6A shows results of imaging four treatment sites (three patients) during standard AK treatment at the Dartmouth-Hitchcok Dermatology department using non-occluded topical ALA application, according to an embodiment of the present disclosure.

FIG. 6A shows results of imaging four treatment sites (three patients) during standard AK treatment at the Dartmouth-Hitchcok Dermatology department using non-occluded topical ALA application, according to an embodiment of the present disclosure. Three patients undergoing standard AK treatment were imaged before ALA application, at 60-minute incubation, and post-PDT treatment. The resulting average pixel values from each treated site ROI (four total) were plotted for each image. Measurements of all three patients (four sites total) showed PpIX fluorescence accumulation as well as PDT-induced photobleaching. With the baseline (pre-ALA) value set to 10, the average 60 min incubation and post PDT values (averaged over the four sites) were 21.1±6.1 and 11.8±2.6, respectively.

Furthermore, a positive correlation between PDT-induced photobleaching and reported patient discomfort during treatment was observed, where a higher drop in fluorescence correlated to higher patient discomfort.

Figure 6B:
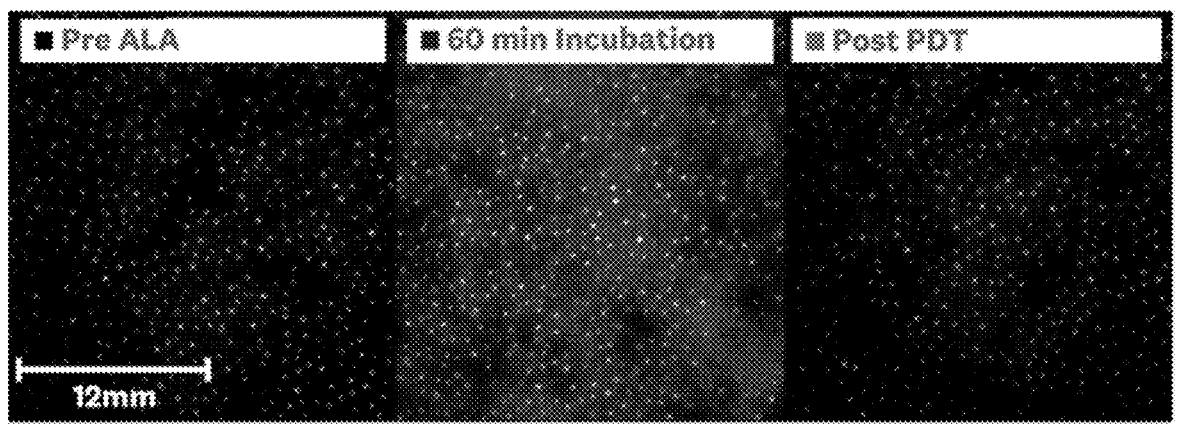
FIG. 6B is a representative treatment image set, corresponding to Patient3-forehead, where the variation of PpIX fluorescence on the surface of the skin can be observed, according to an embodiment of the present disclosure.

FIG. 6B shows a representative treatment image set, corresponding to Patient3-forehead, where the variation of PpIX fluorescence on the surface of the skin can be observed, according to an embodiment of the present disclosure. The image set corresponds to the Patient3-forehead measurements plotted in FIG. 6A. In the image set, the heterogeneous accumulation and photobleaching of the PpIX fluorescence throughout the skin of the patient is observed; it is worth noting that bright spots observed in the images correspond to the patient's sebaceous glands.

The characterization tests for pixel linearity, spectral output, and excitation stability showed the system's 100 ability to overcome measurement reproducibility challenges faced by previously reported quantitative dosimetry systems. Concentration sensitivity tests demonstrated the system's 100 ability to linearly measure PpIX concentrations over two orders of magnitude, as shown in FIG. 4, with sensitivity of detection down to 0.01 µM and maximum linear detection range defined near 2 µM. These concentrations are the PpIX ranges expected in tissue, based upon previous fiber probe measurements, so it was concluded that the system's 100 combination of the 405 nm light array 125, measurement base of the housing 110, 12 bit RAW imaging format of the optical sensor on the computing device 105, fixed imaging distance, and double filtered red emission via the optical filter 120, was suitable for in-vivo imaging.

The data presented in FIGS. 5 and 6 clearly indicate that there is easily measurable signals of PpIX within minutes of application of either AMELUZ® (on mouse skin) or Levulan® (on human skin). In the case of human studies, both PpIX accumulation and PDT-photobleaching were captured for all four skin sites measured. The ALA-produced PpIX had high variability between sites (21.1±6.1 standard deviation), and the photobleaching of it was nearly complete after treatment (falling to an average of 11.8±2.6 after PDT, where the pre-ALA baseline was 10.0). Despite variability of production and photobleaching from PDT, the measurements here indicate that this can be quantified and even spatially analyzed with the system 100.

Furthermore, these wide-field images emphasize how point-probe measurements provide insufficient spatial information to account for variations of PpIX fluorescence throughout the skin. It is worth noting that bright spots observed in the images of FIG. 6B correspond to the patient's sebaceous glands, such that future work could be focused around spatial processing of these images to separate background fluorescence from ALA-induced.

These clinical measurement results showcase the system's 100 ability to capture PpIX accumulation and PDT-induced photobleaching within standard PDT treatment protocols, providing a translational tool that can be easily incorporated in clinical studies. The next phase for the system 100 can be clinical studies that assess the wide-field PpIX accumulation and PDT-induced photobleaching correlation with patient outcomes to establish treatment thresholds. With these established thresholds, treatment planning can be incorporated within the system's 100 iOS application to generate a streamlined clinical workflow for individualized guided PDT treatment.

Based upon the characterization, preclinical, and clinical measurements, alternative embodiments for the design of the system 100 include: (i) a variable long-pass or band-pass wavelength optical filter 120 to balance the tradeoff between signal-to-noise and signal-to-background, and (ii) implementation of control for the light array 125 within the iOS-app for automatic "flash" triggering during imaging.

Another alternative embodiment includes using a gel filter as an alternative to the dielectric filter long-pass filter. Measurement of gel filters (i.e. 780 AS Golden Amber, LEE Filters Inc.) showed the ability to have comparable OD stop-band performance to dielectric filters. Furthermore, implementation of a custom board that integrates battery management and the constant current driver could also allow for cost-reduction and further miniaturization of the system 100.

As described above, advantages include a low cost quantitative wide-field fluorescence imaging system 100 for PpIX-PDT skin dosimetry designed for use in clinical studies and for easy translation into standard clinical workflow was tested for measurement reproducibility and sensitivity as well as in preclinical and clinical environments. Characterization tests of the smartphone-based dosimeter showed the ability of the system 100 to overcome measurement reproducibility issues encountered by previous quantitative systems as well as the ability to image clinically relevant concentrations of PpIX in the 0.01-2.0 µM range. Preclinical measurements of athymic nude mice captured the in-vivo accumulation of PpIX with topical application of ALA, showing the system's 100 ability to be used in preclinical skin studies. The system 100 was also tested in a standard clinical procedure for AK lesion treatment, where it captured wide-field PpIX accumulation and PDT-induced photobleaching. These results lay the foundation for using the system 100 in clinical studies to establish treatment thresholds for the individualization of PDT treatment. The ultimate goal is implementation of these thresholds alongside the system's 100 dosimetry to create a translational workflow that guides critical treatment parameters at the point-of-care for improved patient outcomes, including increased clearance rates and reduced treatment pain.

Figure 7:
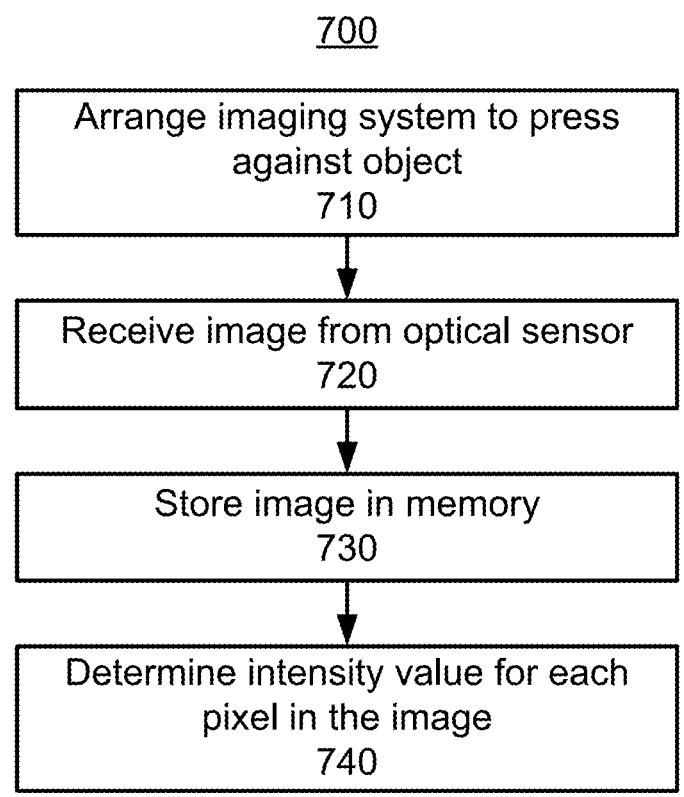
FIG. 7 shows a non-limiting example of a flow chart for a method of determining object identity according to an embodiment of the present disclosure.

FIG. 7 shows a non-limiting example of a flow chart for a method 700 of fluorescent imaging, according to an embodiment of the present disclosure.

Figure 8:
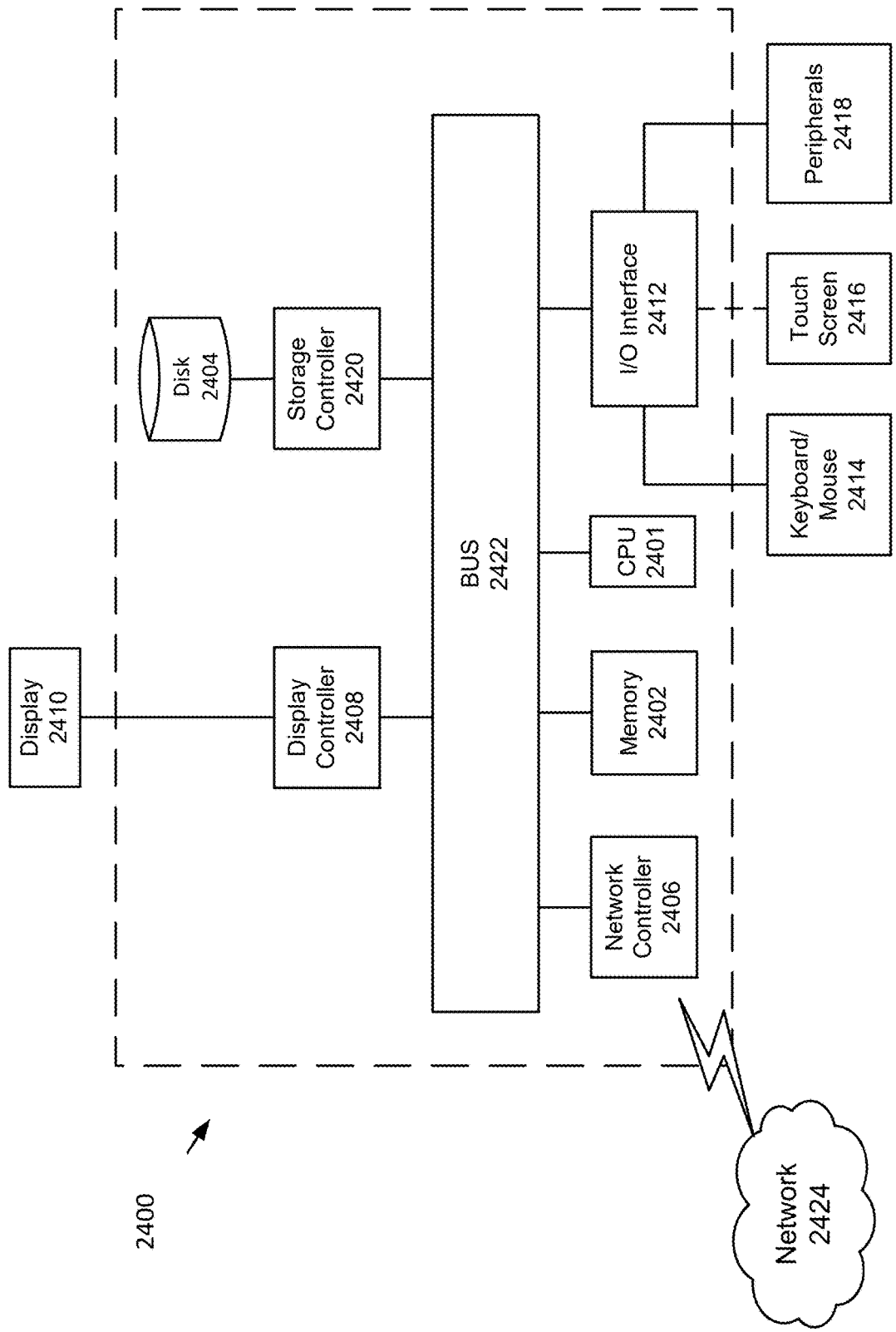
FIG. 8 illustrates a computer system.

FIG. 8 is a block diagram of a hardware description of a computer 2400 used in exemplary embodiments. In the embodiments, computer 2400 can be a desk top, laptop, or server.

In FIG. 8, the computer 2400 includes a CPU 2401 which performs the processes described herein. The process data and instructions may be stored in memory 2402. These processes and instructions may also be stored on a storage medium disk 2404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 2400 communicates, such as a server or computer.

Further, the claimed advancements may be provided as a utility application, background daemon, or component of an operating system, or combination thereof, executing in conjunction with CPU 2401 and an operating system such as Microsoft® Windows®, UNIX®, Oracle® Solaris, LINUX®, Apple macOS® and other systems known to those skilled in the art.

In order to achieve the computer 2400, the hardware elements may be realized by various circuitry elements, known to those skilled in the art. For example, CPU 2401 may be a Xenon® or Core® processor from Intel Corporation of America or an Opteron® processor from AMD of America, or may be other processor types that would be recognized by one of ordinary skill in the art. Alternatively, the CPU 2401 may be implemented on an FPGA, ASIC, PLD or using discrete logic circuits, as one of ordinary skill in the art would recognize. Further, CPU 2401 may be implemented as multiple processors cooperatively working in parallel to perform the instructions of the inventive processes described above.

The computer 2400 in FIG. 8 also includes a network controller 2406, such as an Intel Ethernet PRO network interface card from Intel Corporation of America, for interfacing with network 2424. As can be appreciated, the network 2424 can be a public network, such as the Internet, or a private network such as LAN or WAN network, or any combination thereof and can also include PSTN or ISDN sub-networks. The network 2424 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 2400 further includes a display controller 2408, such as a NVIDIA® GeForce® GTX or Quadro® graphics adaptor from NVIDIA Corporation of America for interfacing with display 2410, such as a Hewlett Packard® HPL2445w LCD monitor. A general purpose I/O interface 2412 interfaces with a keyboard and/or mouse 2414 as well as an optional touch screen panel 2416 on or separate from display 2410. General purpose I/O interface 2412 also connects to a variety of peripherals 2418 including printers and scanners, such as an OfficeJet® or DeskJet® from Hewlett Packard.

The general purpose storage controller 2420 connects the storage medium disk 2404 with communication bus 2422, which may be an ISA, EISA, VESA, PCI, or similar, for interconnecting all of the components of the computer 2400. A description of the general features and functionality of the display 2410, keyboard and/or mouse 2414, as well as the display controller 2408, storage controller 2420, network controller 2406, and general purpose I/O interface 2412 is omitted herein for brevity as these features are known.

Figure 9:
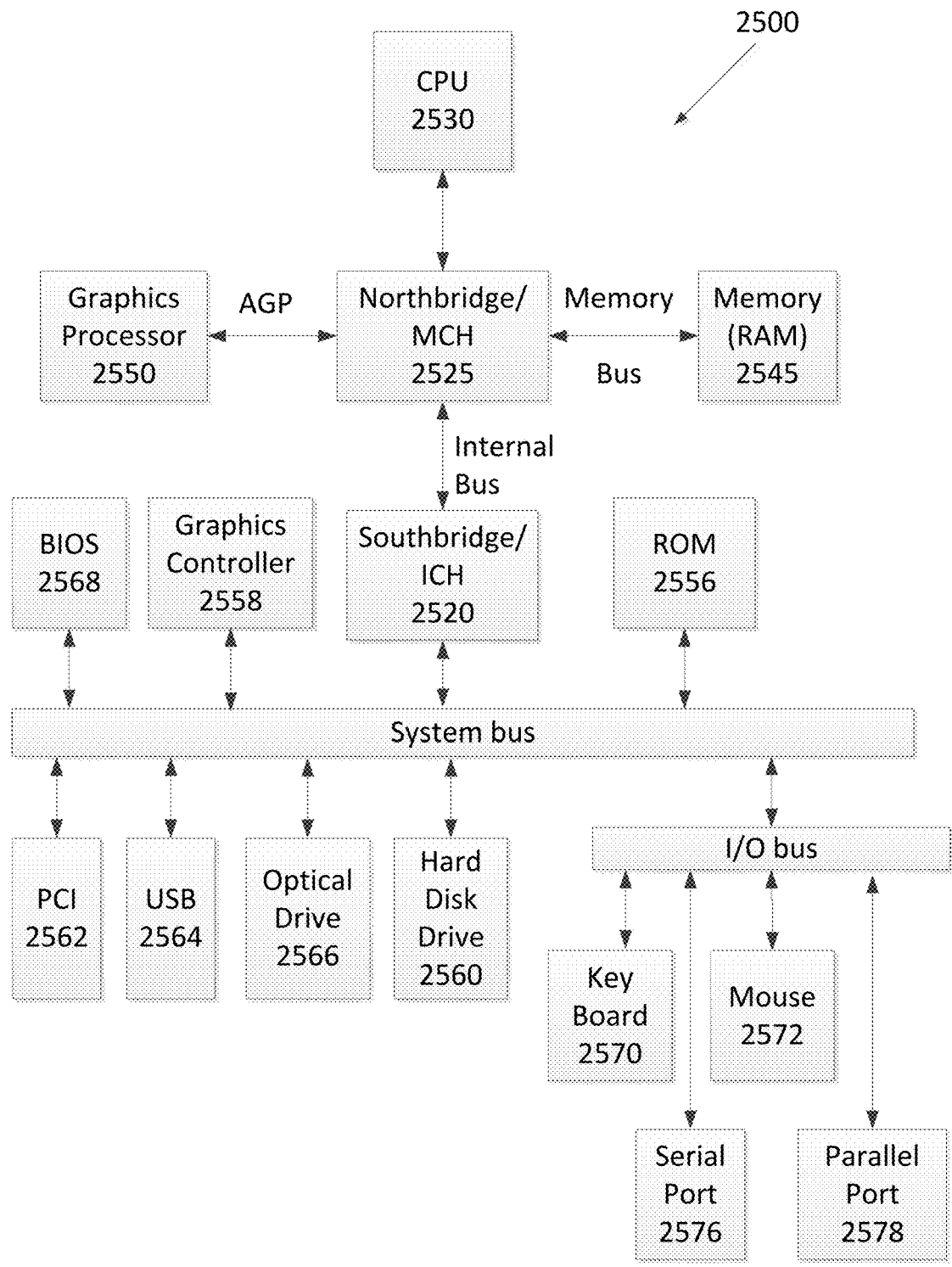
FIG. 9 illustrates a data processing system.

FIG. 9 is a schematic diagram of an exemplary data processing system. The data processing system is an example of a computer in which code or instructions implementing the processes of the illustrative embodiments can be located.

In FIG. 9, data processing system 2500 employs an application architecture including a north bridge and memory controller hub (NB/MCH) 2525 and a south bridge and input/output (I/O) controller hub (SB/ICH) 2520. The central processing unit (CPU) 2530 is connected to NB/MCH 2525. The NB/MCH 2525 also connects to the memory 2545 via a memory bus, and connects to the graphics processor 2550 via an accelerated graphics port (AGP). The NB/MCH 2525 also connects to the SB/ICH 2520 via an internal bus (e.g., a unified media interface or a direct media interface). The CPU 2530 can contain one or more processors and even can be implemented using one or more heterogeneous processor systems.

Referring again to FIG. 9, the data processing system 2500 can include the SB/ICH 2520 being coupled through a system bus to an I/O Bus, a read only memory (ROM) 2556, universal serial bus (USB) port 2564, a flash binary input/output system (BIOS) 2568, and a graphics controller 2558. PCI/PCIe devices can also be coupled to SB/ICH 2520 through a PCI bus 2562.

The PCI devices can include, for example, Ethernet adapters, add-in cards, and PC cards for notebook computers. The Hard disk drive 2560 and CD-ROM 2566 can use, for example, an integrated drive electronics (IDE) or serial advanced technology attachment (SATA) interface. In one implementation the I/O bus can include a super I/O (SIO) device.

Further, the hard disk drive (HDD) 2560 and optical drive 2566 can also be coupled to the SB/ICH 2520 through a system bus. In one implementation, a keyboard 2570, a mouse 2572, a parallel port 2578, and a serial port 2576 can be connected to the system bus through the I/O bus. Other peripherals and devices can be connected to the SB/ICH 2520 using a mass storage controller such as SATA or PATA, an Ethernet port, an ISA bus, a LPC bridge, SMBus, a DMA controller, and an Audio Codec.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

"Substrate" or "target substrate" as used herein generically refers to an object being processed in accordance with the invention. The substrate may include any material portion or structure of a device, particularly a semiconductor or other electronics device, and may, for example, be a base substrate structure, such as a semiconductor wafer, reticle, or a layer on or overlying a base substrate structure such as a thin film. Thus, substrate is not limited to any particular base structure, underlying layer or overlying layer, patterned or un-patterned, but rather, is contemplated to include any such layer or base structure, and any combination of layers and/or base structures. The description may reference particular types of substrates, but this is for illustrative purposes only.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

Embodiments of the present disclosure may also be as set forth in the following parentheticals.

(1) A fluorescence imaging apparatus, comprising: a housing including a first end, a second end, and an exit aperture disposed at the first end and optically connected to a window disposed at the second end, a mount disposed at the second end and configured to removeably couple a computing device to the housing such that an optical sensor of the computing device is aligned with the window, and an optical filter disposed between the optical sensor and the exit aperture; a light array disposed at the first end of the housing, the light array including a plurality of excitation light sources and a plurality of imaging light sources, the plurality of excitation light sources configured to emit light in a predetermined excitation wavelength range, the plurality of imaging light sources configured to emit light in a predetermined imaging wavelength range; and a cushion removeably attached to the first end of the housing and surrounding the exit aperture, the cushion configured to couple the first end of the housing to a surface of an object to prevent light from an exterior of the cushion from entering an interior of the cushion, wherein the optical filter is configured to prevent transmission of electromagnetic radiation having a wavelength in the predetermined excitation wavelength range.

(2) The apparatus of (1), wherein the light array is mounted on a printed circuit board (PCB) having a metal-based core, the PCB being attached to the first end of the housing.

(3) The apparatus of either (1) or (2), wherein the housing and the cushion are optically opaque.

(4) The apparatus of any one of (1) to (3), wherein the plurality of excitation light sources and the plurality of imaging light sources are arranged between the optical sensor and the exit aperture.

(5) The apparatus of any one of (1) to (4), wherein the plurality of excitation light sources are configured to emit the light in the predetermined excitation wavelength range, which is 150 nm to 1,500 nm, or 200 nm to 1,000 nm, or 250 nm to 900 nm, or 280 nm to 850 nm.

(6) The apparatus of any one of (1) to (5), wherein a material of the optical filter is one of a dielectric, a color-glass, and a gel.

(7) A fluorescence imaging system, comprising: the apparatus of (1); and the computing device, which includes a memory, processing circuitry, and the optical sensor, wherein the processing circuitry is configured to set a shutter speed, an ISO, and a focal distance, of the optical sensor, receive, via the optical sensor, an image; and store the image.

(8) The system of (7), wherein the processing circuitry is further configured to determine an intensity value for each of a plurality of pixels in the image.

(9) The system of either (7) or (8), wherein a focal distance of the optical sensor is fixed and in a range of 0.5 mm to 5,000 mm, or 1.0 mm to 2,500 mm, or 2.5 mm to 2,000 mm, or 5 mm to 1,000 mm.

(10) The system of any one of (7) to (9), wherein the plurality of excitation light sources is configured to cause emission of protoporphyrin IX (PpIX) over an area of the object.

(11) The apparatus of any one of (7) to (10), wherein the optical sensor is configured to image the emission of the PpIX over the area.

(12) The apparatus of any one of (7) to (11), wherein the processing circuitry is further configured to determine an intensity of the emission of the PpIX over the area for each image received.

(13) The apparatus of any one of (7) to (12), wherein the image received by the processing circuitry is in a raw image format.

(14) A method for fluorescent imaging using an imaging apparatus including a computing device, a housing, a light array, and a power source, the computing device including an optical sensor, a memory, and processing circuitry, the housing including a first end, a second end, an exit aperture disposed at the first end and optically connected to a window disposed at the second end, a mount disposed at the second end and configured to removeably couple the computing device to the housing such that the optical sensor is aligned with the window, and an optical filter disposed between the optical sensor and the exit aperture, the light array disposed at the first end of the housing, the light array including a plurality of excitation light sources and a plurality of imaging light sources, the plurality of excitation light sources configured to emit light in a predetermined excitation wavelength range, the plurality of imaging light sources configured to emit light in a predetermined imaging wavelength range, and a cushion removeably attached to the first end of the housing and surrounding the exit aperture, the cushion configured to couple the first end of the housing to a surface of an object to prevent light from an exterior of the cushion from entering an interior of the cushion, the method comprising: arranging the imaging apparatus so as to press against the object such that the light from the exterior is prevented from entering the interior of the cushion; receiving, via the optical sensor, an image; storing the image in the memory; and determining, via the processing circuitry, an intensity value for each of a plurality of pixels in the image.

(15) The method of (14), wherein the plurality of excitation light sources is configured to cause emission of protoporphyrin IX (PpIX) over an area of the object.

(16) The method of either (14) or (15), wherein the determined intensity value for each of the plurality of pixels in the image is based on an intensity of the emission of the PpIX.

(17) The method of any one of (14) to (16), wherein the predetermined wavelength range is 280 nm to 850 nm.

(18) A non-transitory computer readable storage medium including executable instructions, wherein the instructions, when executed by circuitry, cause the circuitry to perform the method according to (14).

The following provide supplementary description for the work described herein. The following are hereby incorporated by reference in their entirety:

M. B. Ericson, A.-M. Wennberg, and O. Larkö, "Review of photodynamic therapy in actinic keratosis and basal cell carcinoma," Ther Clin Risk Manag 4 (1), 1-9 (2008).

J. P. Celli et al., "Imaging and Photodynamic Therapy: Mechanisms, Monitoring, and Optimization," Chem. Rev. 110 (5), 2795-2838 (2010) [doi: 10.1021/cr900300p].

B. Dréno et al., "Management of actinic keratosis: a practical report and treatment algorithm from AKTeamTM expert clinicians," Journal of the European Academy of Dermatology and Venereology 28 (9), 1141-1149 (2014) [doi: 10.1111/jdv.12434].

X. Zhou et al., "Photosensitizer dosimetry controlled PDT treatment planning reduces inter-individual variability in response to PDT," in Optical Methods for Tumor Treatment and Detection: Mechanisms and Techniques in Photodynamic Therapy XV 6139, p. 61390P, International Society for Optics and Photonics (2006) [doi: 10.1117/12.647439].

S. C. Kanick et al., "Dual-channel red/blue fluorescence dosimetry with broadband reflectance spectroscopic correction measures protoporphyrin IX production during photodynamic therapy of actinic keratosis," J Biomed Opt 19 (7) (2014) [doi: 10.1117/1.JBO.19.7.075002].

J. Tyrrell, C. Paterson, and A. Curnow, "Regression Analysis of Protoporphyrin IX Measurements Obtained During Dermatological Photodynamic Therapy," Cancers 11 (1), 72 (2019) [doi: 10.3390/cancers11010072].

F. Piffaretti et al., "Correlation between Protoporphyrin IX Fluorescence Intensity, Photobleaching, Pain and Clinical Outcome of Actinic Keratosis Treated by Photodynamic Therapy," DRM 227 (3), 214-225 (2013) [doi: 10.1159/000353775].

J. S. Tyrrell, S. M. Campbell, and A. Curnow, "The relationship between protoporphyrin IX photobleaching during real-time dermatological methyl-aminolevulinate photodynamic therapy (MAL-PDT) and subsequent clinical outcome," Lasers in Surgery and Medicine 42 (7), 613-619 (2010) [doi: 10.1002/lsm.20943].

S. Mordon, "A commentary on the role of skin temperature on the effectiveness of ALA-PDT in Dermatology," Photodiagnosis and Photodynamic Therapy 11 (3), 416-419 (2014) [doi: 10.1016/j.pdpdt.2014.05.004].

C. V. Nissen et al., "Short-term chemical pretreatment cannot replace curettage in photodynamic therapy," Photodermatol Photoimmunol Photomed 32 (3), 146-152 (2016) [doi: 10.1111/phpp.12236].

K. R. Rollakanti, S. Anand, and E. V. Maytin, "Vitamin D enhances the efficacy of photodynamic therapy in a murine model of breast cancer," Cancer Med 4 (5), 633-642 (2015) [doi: 10.1002/cam4.361].

H. S. de Bruijn et al., "Light Fractionation Significantly Increases the Efficacy of Photodynamic Therapy Using BF-200 ALA in Normal Mouse Skin," PLOS One 11 (2), c0148850 (2016) [doi: 10.1371/journal.pone.0148850].

X. Zhou et al., "Pretreatment photosensitizer dosimetry reduces variation in tumor response," International Journal of Radiation Oncology*Biology*Physics 64 (4), 1211-1220 (2006) [doi: 10.1016/j.ijrobp.2005.11.019].

K. Christiansen, P. Bjerring, and A. Troilius, "5-ALA for photodynamic photorejuvenation-optimization of treatment regime based on normal-skin fluorescence measurements," Lasers in Surgery and Medicine 39 (4), 302-310 (2007) [doi: 10.1002/lsm.20488].

J.-D. Fauteck et al., "Fluorescence characteristics and pharmacokinetic properties of a novel self-adhesive 5-ALA patch for photodynamic therapy of actinic keratoses," Arch Dermatol Res 300 (2), 53 (2007) [doi: 10.1007/s00403-007-0787-0].

W. Bäumler, C. Abels, and R.-M. Szeimies, "Fluorescence Diagnosis and Photodynamic Therapy in Dermatology," Medical Laser Application 18 (1), 47-56 (2003) [doi: 10.1078/1615-1615-00087].

T. Smits et al., "Fluorescence diagnosis in keratinocytic intraepidermal neoplasias," Journal of the American Academy of Dermatology 57 (5), 824-831 (2007) [doi: 10.1016/j.jaad.2007.06.031].

M. B. Ericson et al., "Photodynamic therapy of actinic keratosis at varying fluence rates: assessment of photobleaching, pain and primary clinical outcome," British Journal of Dermatology 151 (6), 1204-1212 (2004) [doi: 10.1111/j.1365-2133.2004.06211.x].

A. Bogaards et al., "In vivo quantification of fluorescent molecular markers in real-time by ratio imaging for diagnostic screening and image-guided surgery," Lasers in Surgery and Medicine 39 (7), 605-613 (2007) [doi: 10.1002/lsm.20525].

A. K. L. Fujita et al., "Fluorescence evaluations for porphyrin formation during topical PDT using ALA and methyl-ALA mixtures in pig skin models," Photodiagnosis and Photodynamic Therapy 15, 236-244 (2016) [doi: 10.1016/j.pdpdt.2016.05.008].

J. Tyrrell, S. M. Campbell, and A. Curnow, "Monitoring the accumulation and dissipation of the photosensitizer protoporphyrin IX during standard dermatological methyl-aminolevulinate photodynamic therapy utilizing non-invasive fluorescence imaging and quantification," Photodiagnosis and Photodynamic Therapy 8 (1), 30-38 (2011) [doi: 10.1016/j.pdpdt.2010.11.001].

J. Tyrrell, S. M. Campbell, and A. Curnow, "The effect of air cooling pain relief on protoporphyrin IX photobleaching and clinical efficacy during dermatological photodynamic therapy," Journal of Photochemistry and Photobiology B: Biology 103 (1), 1-7 (2011) [doi: 10.1016/j.jphotobiol.2010.12.011].

K. C. Blanco et al., "Clinical Photodynamic Therapy Review and the Brazilian Experience," Journal of Tumor 4 (2), 386-392-392 (2016).

E. P. M. LaRochelle et al., "In vivo wide-field multispectral dosimeter for use in ALA-PpIX based photodynamic therapy of skin," in Optical Methods for Tumor Treatment and Detection: Mechanisms and Techniques in Photodynamic Therapy XXVI 10047, p. 1004707, International Society for Optics and Photonics (2017) [doi: 10.1117/12.2252402].

C. Hörfelt et al., "Single low-dose red light is as efficacious as methyl-aminolevulinate-photodynamic therapy for treatment of acne: clinical assessment and fluorescence monitoring.," Acta dermato-venereologica 89 (4), 372-378 (2009) [doi: 10.2340/00015555-0667].

Y. Zhao et al., "A 2D imaging dosimeter for photodynamic therapy," in Optical Methods for Tumor Treatment and Detection: Mechanisms and Techniques in Photodynamic Therapy XXVIII 10860, p. 1086000, International Society for Optics and Photonics (2019) [doi: 10.1117/12.2508993].

C. S. Betz et al., "A comparative study of normal inspection, autofluorescence and 5-ALA-induced PPIX fluorescence for oral cancer diagnosis," International Journal of Cancer 97 (2), 245-252 (2002) [doi: 10.1002/ijc.1596].

W. J. Cottrell, A. R. Oseroff, and T. H. Foster, "Portable instrument that integrates irradiation with fluorescence and reflectance spectroscopies during clinical photodynamic therapy of cutaneous disease," Review of Scientific Instruments 77 (6), 064302 (2006) [doi: 10.1063/1.2204617].

H. Liu et al., "Development and evaluation of a low-cost, portable, LED-based device for PDT treatment of early-stage oral cancer in resource-limited settings," Lasers in Surgery and Medicine 51 (4), 345-351 (2019) [doi: 10.1002/lsm.23019].

O. Kulyk et al., "Development of a handheld fluorescence imaging device to investigate the characteristics of protoporphyrin IX fluorescence in healthy and diseased skin," Photodiagnosis and Photodynamic Therapy 12 (4), 630-639 (2015) [doi: 10.1016/j.pdpdt.2015.10.002].

S. Kanick et al., "Pre-treatment protoporphyrin IX concentration in actinic keratosis lesions may be a predictive biomarker of response to aminolevulinic-acid based photodynamic therapy," Photodiagnosis Photodyn Ther 12 (4), 561-566 (2015) [doi: 10.1016/j.pdpdt.2015.10.006].

J. Tyrrell, S. Campbell, and A. Curnow, "Validation of a non-invasive fluorescence imaging system to monitor dermatological PDT," Photodiagnosis and Photodynamic Therapy 7 (2), 86-97 (2010) [doi: 10.1016/j.pdpdt.2010.03.002].

Alberto J. Ruiz et al., "Smartphone-based fluorescence imager for PpIX-based PDT treatment planning: System design and initial results," presented at Proc. SPIE, 28 Feb. 2019.

J. M. Dixon, M. Taniguchi, and J. S. Lindsey, "PhotochemCAD 2: A Refined Program with Accompanying Spectral Databases for Photochemical Calculations," Photochemistry and Photobiology 81 (1), 212-213 (2005) [doi: 10.1111/j.1751-1097.2005.tb01544.x].

S. K. Attili, R. Dawe, and S. Ibbotson, "A review of pain experienced during topical photodynamic therapy—Our experience in Dundee," Photodiagnosis and Photodynamic Therapy 8 (1), 53-57 (2011) [doi: 10.1016/j.pdpdt.2010.12.008].

The invention claimed is:

1. A fluorescence imaging apparatus, comprising:
a housing including a first end, a second end, and an exit aperture disposed at the first end and optically connected to a window disposed at the second end, a mount disposed at the second end and configured to removeably couple a computing device to the housing such that an optical sensor of the computing device is aligned with the window, and an optical filter disposed in the window between the optical sensor and the exit aperture, the optical filter being removable from the window;

a light ring disposed at the first end of the housing and mounted on a printed circuit board (PCB) having a metal core, the PCB being attached to the first end of the housing and configured to dissipate heat generated by the light ring, the light ring including a plurality of excitation light sources and a plurality of imaging light sources arranged on an outer portion of the light ring wherein one of the excitation light sources is arranged directly adjacent to one of the imaging light sources, the plurality of excitation light sources configured to emit light in a predetermined excitation wavelength range, the plurality of imaging light sources configured to emit light in a predetermined imaging wavelength range; and a cushioned ring removeably attached to the first end of the housing, contacting and surrounding the exit aperture, the cushioned ring configured to couple the first end of the housing to a surface of an object to block external light from an exterior of the cushioned ring, wherein the optical filter is configured to prevent transmission of electromagnetic radiation having a wavelength in the predetermined excitation wavelength range.

2. The apparatus of claim 1, wherein the housing and the cushion are optically opaque.

3. The apparatus of claim 1, wherein the plurality of excitation light sources and the plurality of imaging light sources are arranged between the optical sensor and the exit aperture.

4. The apparatus of claim 1, wherein the plurality of excitation light sources are configured to emit the light in the predetermined excitation wavelength range, which is 280 nm to 850 nm.

5. The apparatus of claim 1, wherein a material of the optical filter is one of a dielectric, a color-glass, and a gel.

6. A fluorescence imaging system, comprising:
the apparatus of claim 1; and
the computing device, which includes a memory, processing circuitry, and the optical sensor, wherein the processing circuitry is configured to
set a shutter speed, an ISO, and a focal distance, of the optical sensor,
receive, via the optical sensor, an image; and
store the image.

7. The system of claim 6, wherein the processing circuitry is further configured to determine an intensity value for each of a plurality of pixels in the image.

8. The system of claim 6, wherein a focal distance of the optical sensor is fixed and in a range of 5-1,000 mm.

9. The system of claim 6, wherein the plurality of excitation light sources is configured to cause emission of protoporphyrin IX (PpIX) over an area of the object.

10. The system of claim 9, wherein the optical sensor is configured to image the emission of the PpIX over the area.

11. The system of claim 10, wherein the processing circuitry is further configured to determine an intensity of the emission of the PpIX over the area for each image received.

12. The system of claim 6, wherein the image received by the processing circuitry is in a raw image format.

13. A method for fluorescent imaging using an imaging apparatus including a computing device, a housing, a light array ring, and a power source, the computing device including an optical sensor, a memory, and processing circuitry, the housing including a first end, a second end, an exit aperture disposed at the first end and optically connected to a window disposed at the second end, a mount disposed at the second end and configured to removeably couple the computing device to the housing such that the optical sensor is aligned with the window, and an optical filter disposed in the window between the optical sensor and the exit aperture, the optical filter being removable from the window, the light ring disposed at the first end of the housing and mounted on a printed circuit board (PCB) having a metal core, the PCB being attached to the first end of the housing and configured to dissipate heat generated by the light ring, the light ring including a plurality of excitation light sources and a plurality of imaging light sources arranged on an outer portion of the light ring, wherein one of the excitation light sources is arranged directly adjacent to one of the imaging light sources, the plurality of excitation light sources configured to emit light in a predetermined excitation wavelength range, the plurality of imaging light sources configured to emit light in a predetermined imaging wavelength range, and a cushioned ring removeably attached to the first end of the housing, contacting and surrounding the exit aperture, the cushioned ring configured to couple the first end of the housing to a surface of an object to block external prevent light from an exterior of the cushioned ring, the method comprising:

arranging the imaging apparatus so as to press against the object such that the light from the exterior is prevented from entering the interior of the cushion;
receiving, via the optical sensor, an image;
storing the image in the memory; and
determining, via the processing circuitry, an intensity value for each of a plurality of pixels in the image.

14. The method of claim 13, wherein the plurality of excitation light sources is configured to cause emission of protoporphyrin IX (PpIX) over an area of the object.

15. The method of claim 14, wherein the determined intensity value for each of the plurality of pixels in the image is based on an intensity of the emission of the PpIX.

16. The method of claim 13, wherein the plurality of excitation light sources are configured to emit the light having a wavelength range of is 280 nm to 850 nm.

17. A non-transitory computer readable storage medium including executable instructions, wherein the instructions, when executed by circuitry, cause the circuitry to perform the method according to claim 13.

* * * * *